No. 824,544. PATENTED JUNE 26, 1906.
G. HOSSEGE.
PIPE HANGER.
APPLICATION FILED DEC. 4, 1905.

Witnesses
_____
C. W. Griesbauer

Inventor
George Hossege
by H. B. Willson
Attorney

UNITED STATES PATENT OFFICE.

GEORGE HOSSEGE, OF NEW CASTLE, PENNSYLVANIA.

PIPE-HANGER.

No. 824,544.　　　　Specification of Letters Patent.　　　Patented June 26, 1906.

Application filed December 4, 1905. Serial No. 290,274.

*To all whom it may concern:*

Be it known that I, GEORGE HOSSEGE, a citizen of the United States, residing at New Castle, in the county of Lawrence and State of Pennsylvania, have invented certain new and useful Improvements in Pipe-Hangers; and I do declare the following to be a full, clear, and exact description of the invention, such as will enable others skilled in the art to which it appertains to make and use the same.

My invention relates to improvements in pipe-hangers, and more particularly to one adapted for hanging or supporting the usual air-brake hose, whistle-hose, and steam-hose beneath railway-cars.

The object of the invention is to provide a simple, durable, and inexpensive device of this character which will securely support these pipes or hose in convenient positions, one above the other.

With the above and other objects in view the invention consists of certain novel features of construction, combination, and arrangement of parts, as will be hereinafter more fully described and claimed.

Figure 1:
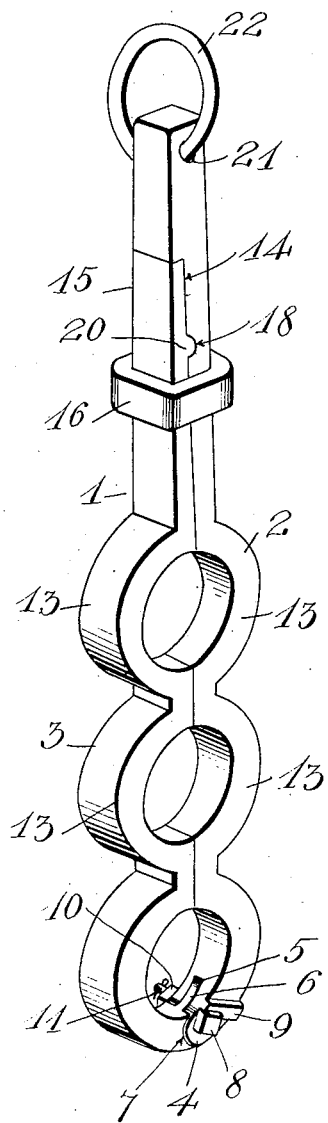
Figure 2:
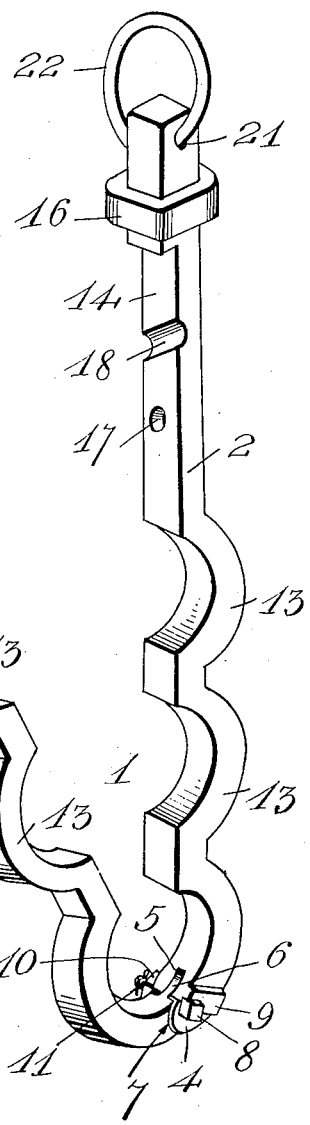
Figure 3:
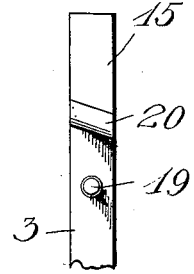

In the accompanying drawings, Figure 1 is a perspective view of the hanger in its closed position. Fig. 2 is a similar view of the same in its open position, and Fig. 3 is a detail view of the free end of one of the members.

Referring to the drawings by numeral, 1 denotes my improved pipe or hose hanger, which consists of two similar members 2 3, which are pivotally connected at their lower ends. This pivotal connection is preferably effected by forming the rounded end 4 of the member 2 with a slot or recess 5 to receive a reduced end or tongue 6, formed upon the lower end of the member 3. The said end of the member 3 is curved or recessed, as at 7, to receive the curved end 4, the curvature of the portions 4 and 7 being concentric with a pivot-bolt 8, which is passed through alining openings in the slotted or bifurcated end 4 and the reduced end or tongue 6. This bolt is prevented from rotating by the engagement of its head with a stop lug or projection 9, formed upon one face of the member 2, as shown. A nut 10 is secured upon the threaded end of the bolt, and, if desired, it may be locked thereon by a split pin or key 11, which is passed through a transverse opening in said end of the bolt. The members 2 3 are thus pivotally connected to permit them to be opened, so that one or more pipes or hose may be placed between the coacting semicircular sockets or jaws 13, which are formed in the opposing faces of the two members. As shown, three of these semicircular jaws are provided in each member, and they are so arranged that when the two members are in their closed position the opposing jaws 13 form circular sockets through which the pipes or hose extend and in which they are clamped or supported. While I preferably provide three—one for the air-brake hose, one for the steam-pipe hose, and one for the whistle-hose usually found on railway-cars—it will be understood that a greater or less number of sockets may be provided in each hanger, according to the use for which it is designed. The upper portion of the member 2 tapers upwardly and is recessed, as shown at 14, upon its inner face to receive the tapered upper end 15 of the member 3. This end of the latter is adapted to have its outer face lie flush with the corresponding face of the member 2, so that a locking collar or sleeve 16 may be slid longitudinally upon the members to lock or release them. When this slide or sleeve 16 is moved upwardly upon the member 2 above its recessed portion 14, it will be seen that the member 3 may be swung outwardly to its open position (shown in Fig. 2) and that when said member 3 is swung into the recess 14 and the slide or sleeve 16 is wedged downwardly upon the tapered upper portions of the two members, the latter will be securely clamped together to retain the pipes or hose between them. In order to cause the two members 2 3 to properly aline when swung closed and to relieve the pivot-bolt 8 of undue strain, I preferably form in the inner face of the member 2 a circular socket or recess 17 and an angularly-disposed transverse groove or recess 18, which is of semicylindrical form, and I also provide or form at alining points upon the inner face of the member 3 a tapered stud or projection 19 to enter the socket 17 and an angularly-disposed transversely-extending semicylindrical rib or projection 20, which is adapted to enter the groove or recess 18. This construction causes the two members to be held firmly together and prevents both lateral and longitudinal movement of one with respect to the other. The hanger may be supported or mounted in any desired manner; but I preferably provide in an opening 21 in the upper end of the member 2 an eye or ring 22, which is adapted to engage a hook, staple, or other supporting device.

From the foregoing description, taken in connection with the accompanying drawings, the operation and advantages of the invention will be readily understood without requiring a more extended explanation.

Various changes in the form, proportion, and the minor details of construction may be resorted to without departing from the principle or sacrificing any of the advantages of the invention.

Having thus described my invention, what I claim as new, and desire to secure by Letters Patent, is—

1. A hanger of the character described, comprising two pivotally-connected members having recesses or half-sockets in their opposing faces and longitudinally-tapered portions at their free ends, one of said members being provided with a recess adapted to receive the free end of the other and said members being provided with a coacting stud and socket, and a locking-slide upon the tapered portions of said members.

2. A hanger of the character described, comprising two pivotally-connected members having recesses or half-sockets in their opposing faces and longitudinally-tapered portions at their free ends, one of said members being provided with a recess adapted to receive the free end of the other and said members being further provided with a co-acting transversely-extending, angularly-disposed rib, and a similarly shaped and arranged groove, and a locking-slide upon the tapered portions of said members.

3. A hanger of the character described comprising two members 2 3 having in their opposing faces, semicircular sockets or jaws, said member 3 having its lower end formed with a reduced tongue to enter the bifurcated lower end of the member 2, a pivot-bolt passed through said bifurcated end and tongue, the upper portions of said members being tapered upwardly and the member 2 having in its inner face a recess to receive the upper portion of the member 3, said member 2 having a socket and a groove and said member 3 having a stud and a rib to coact respectively with the socket and groove of the member 2, and a locking slide or sleeve upon the tapered upper portions of said members, and means for supporting said hanger.

In testimony whereof I have hereunto set my hand in presence of two subscribing witnesses.

GEORGE HOSSEGE.

Witnesses:
ETHEL M. PLATT,
W. S. REYNOLDS.